C. WILT.
MINNOW.
APPLICATION FILED AUG. 26, 1911. RENEWED FEB. 6, 1913.

1,073,199. Patented Sept. 16, 1913.

WITNESSES

INVENTOR
Clinton Wilt
By E. E. Vrooman, Attorney.

UNITED STATES PATENT OFFICE.

CLINTON WILT, OF SPRINGFIELD, MISSOURI.

MINNOW.

1,073,199.  Specification of Letters Patent.  Patented Sept. 16, 1913.

Application filed August 26, 1911, Serial No. 646,148. Renewed February 6, 1913. Serial No. 746,663.

*To all whom it may concern:*

Be it known that I, CLINTON WILT, a citizen of the United States, residing at Springfield, in the county of Greene and State of Missouri, have invented certain new and useful Improvements in Minnows, of which the following is a specification, reference being had therein to the accompanying drawing.

This invention relates to artificial bait for fishing and has for one of its objects to provide a bait in which a spinner is employed for rotating a body, and a second spinner that coöperates with the first one, but rotates in a direction opposite to the rotation of said body.

Another object of the invention is the employment of a weight having a neat and attractive appearance which is mounted upon a shaft extending longitudinally through said body and which prevents rotation of said shaft. The novel weight also has attached thereto a hook which extends longitudinally of said body when the same is in the water but it does not rotate with the body owing to the fixed position of said weight upon said shaft.

Figure 1:
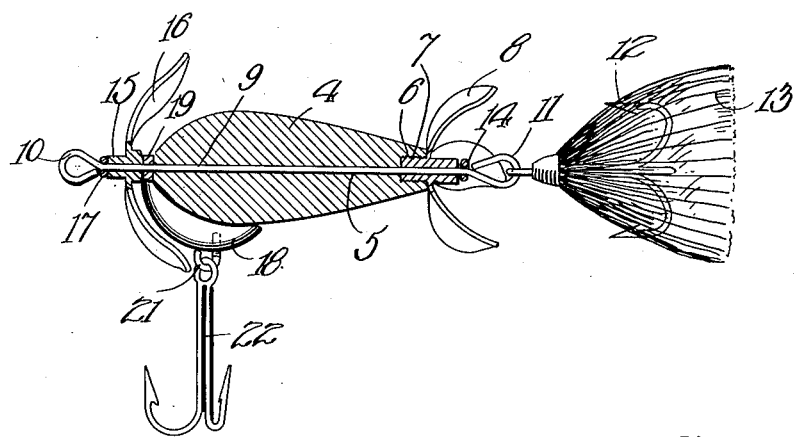
Figure 2:
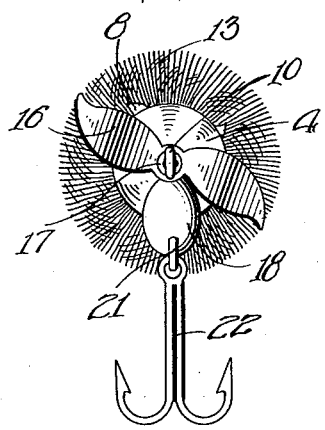
Figure 3:
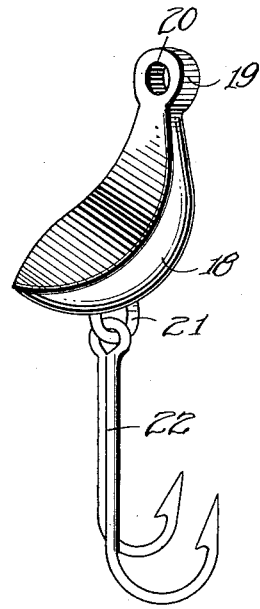

In carrying out the objects of the invention generally stated above, it will be understood, of course, that the essential features thereof are susceptible of changes in detail and structural arrangements, one preferred and practical embodiment being shown in the accompanying drawings wherein:

Figure 1 is a longitudinal sectional view constructed in accordance with this invention. Fig. 2 is a front elevation thereof. Fig. 3 is a detail perspective view of the weight used in connection with the invention also showing a hook attached thereto.

Referring to the accompanying drawings by numerals it will be seen that the improved bait comprises a body 4 which is shaped to imitate a small fish and which is provided with a central longitudinally extending opening 5. The rear end of said opening is enlarged and threaded as indicated at 6 for the reception of an externally threaded plug 7 which carries a spinner 8 intermediate the ends thereof, said spinner being formed preferably with three blades. The plug 7 is also provided with a longitudinal opening and is in alinement with the opening 5 of the body and forms a continuation thereof.

Extending through the openings in the body 4 and plug 7 is a shaft 9, the projecting front and rear ends of said shaft being provided with eyes 10 and 11, the eye 10 being adapted to have a line attached thereto. A hook 12 has its end eye attached to the eye 11 of the shaft and is provided with a tail 13. At the rear end of the shaft 9 intermediate the end eye 11 and the plug 7 there is secured a ring 14 which prevents longitudinal movement of said shaft relative to said body in one direction. Rotatably mounted upon the forward portion of the shaft 9 is a collar 15 which is provided with a spinner 16 which rotates in an opposite direction from the spinner 8, and which is preferably composed of two oppositely disposed blades. A ring 17 is fixed upon the shaft intermediate the collar 15 and the eye 10 and prevents longitudinal movement of said collar relative to said shaft in a forward direction. A substantially crescent shaped weight 18 is provided at one end with an enlarged portion 19, said portion being provided with a transverse opening 20. The weight 18 is adapted to be rigidly secured upon shaft 9 intermediate said body and the collar 15 and said shaft is adapted to be passed through the opening 20. When in position the inner concave surface of the weight is shaped to a contour of the forward end of the body 4. Adjacent the free end thereof said weight is provided with a projecting eye 21 with which the eye of a hook 22 engages.

From the foregoing, it will be obvious that when the artificial bait is moving through the water the rear spinner 8 will rotate the body 4 in one direction, the front spinner 16 will rotate in a direction opposite from that of the rear spinner, and that the weight 18 will prevent the shaft 9 from rotating and will permit of the hook 22 maintaining a longitudinal position.

Having thus described my invention, what I claim is:—

1. An artificial bait comprising a shaft, a body rotatably mounted thereon, means for rotating said body, a spinner mounted upon the forward end of said shaft, a substantially crescent-shaped weight securely mounted on said shaft, the inner surface of said weight conforming to the contour of the forward end of said body, and a hook depending from said weight.

2. An artificial bait comprising a fixed shaft, a body rotatably mounted thereon, a hook carried by the rear end of said shaft, means for rotating said body, a spinner carried by the forward portion of said shaft, means for preventing longitudinal movement of said spinner in one direction, a weight secured to said shaft intermediate said body and said spinner, said weight being provided at one end with a transverse opening for engagement with said shaft, and a hook extending from said weight.

3. An artificial bait comprising a shaft, a body rotatable thereon, means for rotating said body, and a crescent-shaped weight on the forward portion of said shaft, said weight conforming to the contour of the forward end of said body.

In testimony whereof I hereunto affix my signature in presence of two witnesses.

CLINTON WILT.

Witnesses:
H. CLAY LLOYD,
W. C. DILLARD.